(12) United States Patent
Benson et al.

(10) Patent No.: US 9,527,237 B2
(45) Date of Patent: Dec. 27, 2016

(54) INDUCTION HEATING COMPACTION SYSTEM

(71) Applicant: Orbital ATK, Inc., Dulles, VA (US)

(72) Inventors: Vernon M. Benson, Morgan, UT (US); David R. Machac, Ogden, UT (US); Brian J. Loveless, Perry, UT (US)

(73) Assignee: ORBITAL ATK, INC., Plymouth, MN (US)

( * ) Notice: Subject to any disclaimer, the term of this patent is extended or adjusted under 35 U.S.C. 154(b) by 239 days.

(21) Appl. No.: 13/734,661

(22) Filed: Jan. 4, 2013

(65) Prior Publication Data

US 2014/0190629 A1 Jul. 10, 2014

(51) Int. Cl.
| | |
|---|---|
| *B29C 65/32* | (2006.01) |
| *B29C 65/14* | (2006.01) |
| *B29C 70/38* | (2006.01) |
| *B29C 35/08* | (2006.01) |
| *B29K 105/08* | (2006.01) |

(52) U.S. Cl.
CPC ....... *B29C 65/1403* (2013.01); *B29C 35/0805* (2013.01); *B29C 70/388* (2013.01); *B29C 2035/0811* (2013.01); *B29K 2105/0872* (2013.01)

(58) Field of Classification Search
CPC .................................................. B29C 65/3668
USPC .............................. 156/523, 574, 577, 309.6
See application file for complete search history.

(56) References Cited

U.S. PATENT DOCUMENTS

| | | | |
|---|---|---|---|
| 4,714,509 A | 12/1987 | Gruber | |
| 4,822,444 A | 4/1989 | Weingart et al. | |
| 4,883,552 A | 11/1989 | O'Connor et al. | |
| 4,978,825 A * | 12/1990 | Schmidt et al. | 219/633 |
| 4,992,133 A | 2/1991 | Border | |
| 5,160,561 A | 11/1992 | Gruber | |
| 5,160,568 A | 11/1992 | Gruber | |
| 5,177,340 A | 1/1993 | Zaffiro | |
| 5,200,018 A | 4/1993 | Gill et al. | |

(Continued)

FOREIGN PATENT DOCUMENTS

| | | |
|---|---|---|
| DE | 10 2007 009 124 A1 | 8/2008 |
| DE | 10 2010 023 044 A1 | 1/2011 |

(Continued)

OTHER PUBLICATIONS

International Search Report; ISA/EP, International Application No. PCT/US2014/010138, Jun. 24, 2014, five (5) pages.

(Continued)

*Primary Examiner* — Scott W Dodds
(74) *Attorney, Agent, or Firm* — TraskBritt (57) ABSTRACT

An induction heating compaction system is provided. The system includes an induction heating member and a compaction member. The induction heating member is configured to generate an electromagnetic field at a select frequency. The select frequency causes at least one of the fibers and matrix in pre-preg material to heat up. The compaction member has at least a portion that is made from a material that is transparent to the select frequency of the electromagnetic field generated by the induction heating member. The compaction member includes a cooling assembly that is configured and arranged to extract heat from the pre-preg material, while compacting the pre-preg material.

21 Claims, 10 Drawing Sheets

(56) References Cited

U.S. PATENT DOCUMENTS

| | | |
|---|---|---|
| 5,273,602 A | 12/1993 | Gill et al. |
| 5,338,497 A | 8/1994 | Murray et al. |
| 5,447,586 A | 9/1995 | Tam |
| 5,738,749 A | 4/1998 | Grimshaw et al. |
| 5,832,354 A * | 11/1998 | Kouno et al. ............... 399/330 |
| 6,799,619 B2 | 10/2004 | Holmes et al. |
| 6,814,822 B2 | 11/2004 | Holmes et al. |
| 7,731,816 B2 | 6/2010 | Oldani et al. |
| 7,993,124 B2 | 8/2011 | Nelson et al. |
| 8,388,884 B2 | 3/2013 | Nelson et al. |
| 2003/0145932 A1 | 8/2003 | Holmes et al. |
| 2004/0060650 A1 | 4/2004 | Holmes et al. |
| 2007/0187021 A1 | 8/2007 | Oldani et al. |
| 2009/0229760 A1* | 9/2009 | Hamlyn et al. ............... 156/433 |
| 2009/0311506 A1 | 12/2009 | Herbeck et al. |
| 2012/0057018 A1* | 3/2012 | Arp ............................... 348/86 |

FOREIGN PATENT DOCUMENTS

| | | |
|---|---|---|
| EP | 0 167 377 B1 | 10/1990 |
| EP | 1 132 193 A1 | 9/2001 |
| EP | 1 820 626 A1 | 8/2007 |
| WO | 2009/130087 A1 | 10/2009 |

OTHER PUBLICATIONS

Written Opinion of the International Searching Authority, ISA/EP, International Application No. PCT/US2014/010138, Jun. 24, 2014, four (4) pages.

\* cited by examiner

INDUCTION HEATING COMPACTION SYSTEM

BACKGROUND

Composite products can be made from plies of pre-impregnated (pre-preg) material. Pre-preg material includes fibers surrounded by a matrix material, such as a thermosetting or thermoplastic resin or a ceramic matrix. Consolidation of individual ply layers together to form a composite laminate in a buildup is often critical to the quality of the finished composite product. Lack of compaction within the laminate during lamination, before it sees additional consolidation, such as a cure process, press, or other means, can result in wrinkling of the fibers in the laminate, reducing mechanical performance and affecting dimensional characteristics of the finished product. During consolidation it is common to apply heat to the plies of pre-preg material to heat up the matrix material to make the plies more compliant during consolidation. Typical methods of heating and consolidating composites including using hot gas to flood an area in front of a compaction member, using infrared heat to warm the material in front of a compaction member, and using a laser beam to heat material before it is rolled and compacted. Each of these methods requires space allocation for its heating source and space allocation for its compaction member. Many of these systems are energy and time intensive, or have inherent safety issues when an operator is in close proximity.

For the reasons stated above and for other reasons stated below that will become apparent to those skilled in the art upon reading and understanding the present specification, there is a need in the art for a safe, effective and efficient system to consolidate plies of pre-preg material.

SUMMARY

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, an induction heating compaction system is provided that includes an induction system or heating member and a compaction member. The induction heating member is configured to generate an electromagnetic field at a select frequency. The select frequency causes at least one of the fibers and matrix in pre-preg material to heat up. The compaction member is configured and arranged to extract heat from the pre-preg material, while compacting the pre-preg material.

In another embodiment, another induction heating compaction system is provided. The system includes a compaction member or device, an induction heating member, and a cooling assembly. The compaction member is configured and arranged to compact ply layers of pre-preg material. The induction heating member is received within the compaction member. The induction heating member is configured to generate an electromagnetic field at a select frequency. The select frequency causes at least one of the fibers and matrix in pre-preg material to heat up. The compaction member has at least a portion that is made from a material that is transparent to the select frequency of the electromagnetic field generated by the induction heating member, such that the induction field can be directed at a composite pre-preg material to be consolidated, while not heating up the compaction member. The cooling assembly is configured and arranged to extract heat from the pre-preg material to solidify the ply layers of pre-preg material in a compact configuration during an in-situ compaction buildup process.

In yet another embodiment, a method of consolidating pre-preg material ply layers is provided. The method includes: inductively heating an area of at least one of fibers and matrix in at least one first pre-preg material ply layer to soften the matrix in the heated area; and compacting the heated area of the at least one first pre-preg material ply layer during lay-up of the at least one first pre-preg material ply layer over a second pre-preg material ply layer.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout the figures and the specification.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

One benefit of some embodiments of the present invention is that they provide an induction heating compaction system that is relatively compact to save space and make packaging easier. A tighter package allows more contour capability within automation systems. In an embodiment of the present invention, induction heating is used to heat conductive fibers in pre-preg material that, in turn, melts or softens the surrounding matrix to allow tight nesting or consolidation of one ply to a previous laid ply or plies, generally known as an "on-the-fly" or "in-situ" process. An example type of conductive fiber used in the pre-preg material is carbon fiber. Since carbon fiber is conductive, it will heat up when subjected to an alternating electromagnetic field of a given frequency, provided by an induction heater assembly. Besides conductive fibers, non-conductive fibers that are metallically coated could be used. In other embodiments, the matrix is formulated to react directly to the induction heating. In these embodiments, the matrix may be loaded with conductive particles. The conductive particles could be metallic, carbon nanofibers, nanofillers, etc. The conductivity components of the matrix would absorb the induction heating and soften the pre-preg. In yet another embodiment, both the fiber and matrix may react to the induction heating.

A compaction member is then used to compact the plies while still warm\hot as part of the in-situ compaction buildup process. The compaction member, of embodiments, extracts heat from the pre-preg material while compacting the lamina or laminate in a consolidated or cured state. In some embodiments, the compaction member is actively cooled for higher temperature materials or to allow faster process speeds. In embodiments, portions of a compaction member, particularly in the "field of view," so to speak, of the induction field directed toward the composite material, are made from a material that is not affected by the select frequency of the electromagnetic field used to heat up the composite pre-preg material. Hence, in some embodiments, at least a portion of the compaction member is made from material that is transparent to the frequency of the electromagnetic field created by the induction heating member. Moreover, in some embodiments, at least some portions of the compaction member that are not transparent to the frequency of the electromagnetic field are shielded from the induction field.

Figure 1:
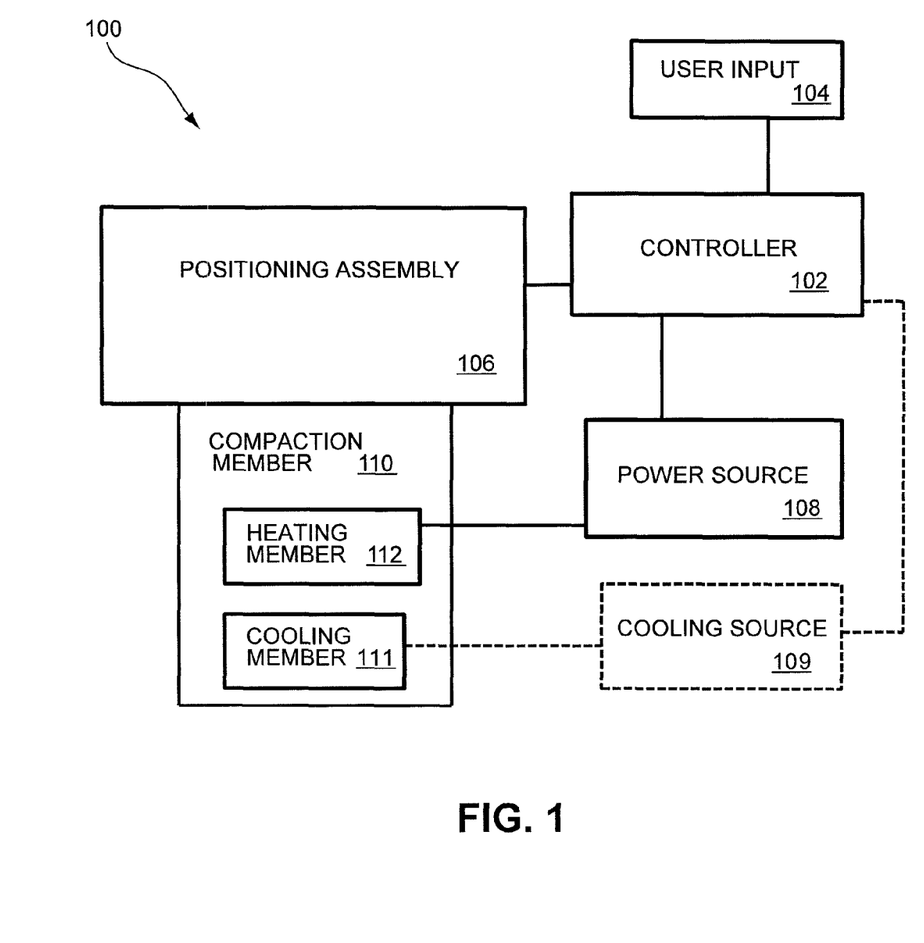
FIG. 1 is a block diagram of an induction heating compaction system of one embodiment of the present invention.
Figure 2:
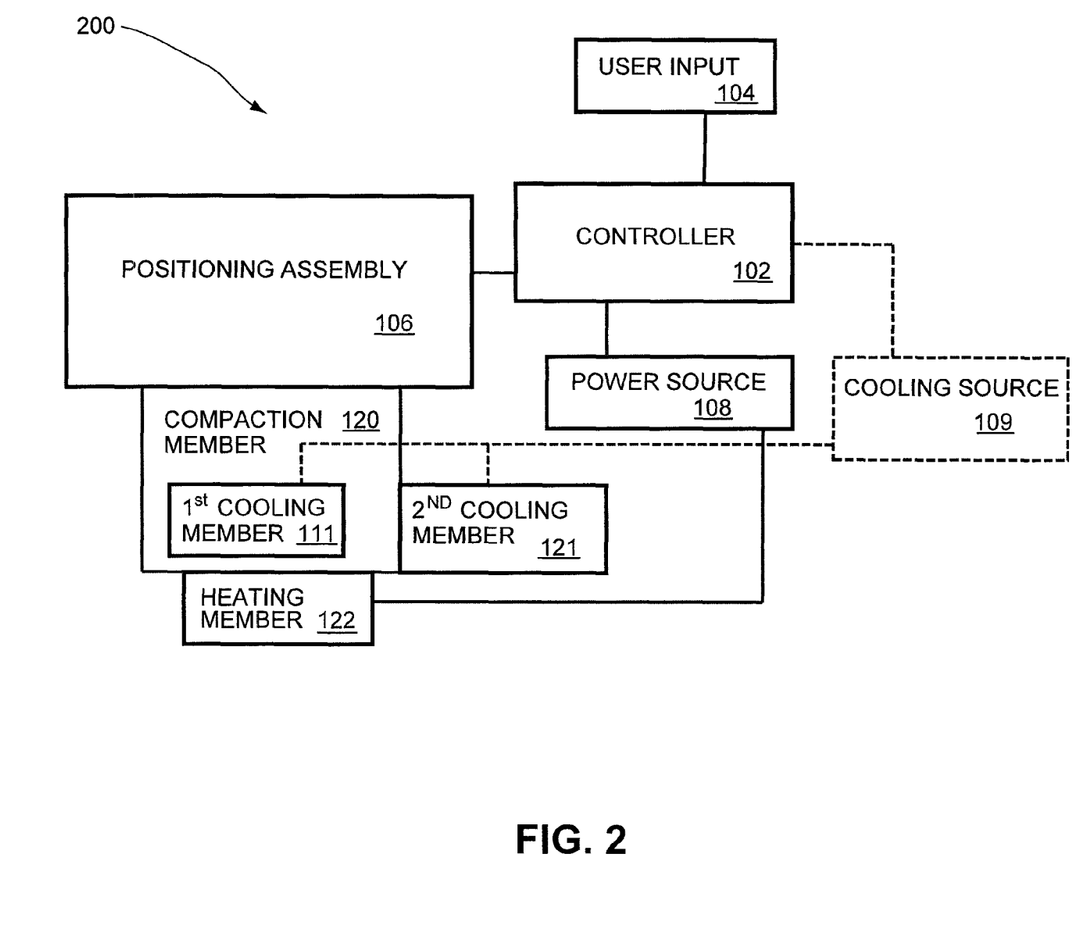
FIG. 2 is a block diagram of another induction heating compaction system of one embodiment of the present invention.

FIG. 1 illustrates a block diagram of an induction heating compaction system 100 of one embodiment. The induction heating compaction system 100 includes a positioning assembly 106 that is coupled to a compaction member 110. The positioning assembly 106 is configured to position the compaction member 110 in relation to pre-preg material, as further discussed below. The positioning assembly 106 is controlled by a controller 102. Controller 102 controls functions of the induction heating compaction system 100. The controller 102 receives commands from a user input 104. The compaction member 110 is designed to consolidate plies of the pre-preg material, as further discussed below. The compaction member 110, in this embodiment, includes a heating member 112 and a cooling member assembly 111. That is, the compaction member 110 of this embodiment has a heating member 112 and a cooling member 111 within its assembly. Placing the heating member 112 and cooling member 111 within the compaction member 110 provides a compact assembly. In embodiments, as discussed above, the heating member 112 is an induction heating member that produces an electromagnetic field of a given frequency that heats up the fibers and or matrix in the pre-preg material. The heating member 112 is in electrical communication with a power source 108 that provides an energy source for operating the heating members 112. In one embodiment, the controller 102 controls the power level and time of the energy coming from power source 108. As discussed above, the compaction member 110 further includes a cooling assembly 111. The cooling assembly 111 may be passive (in that it does not require an external energy source) such as, but not limited to, cooling passages and heat sink material or the cooling member 111 may be an active cooling assembly such as, but not limited to, a fan driven system or a coolant pumping system. If the cooling system is active, the controller 102, in an embodiment, is in communication with a cooling source 109, as shown by dashed lines, that, in turn, regulates cooling levels in the cooling member 111. Example cooling systems are described further below. FIG. 2 illustrates another induction heating compaction system 200. The system 200 is similar to the system 100, described in relation to FIG. 1. However, in the embodiment of FIG. 2, a heating member 122 is positioned proximate the compaction member 120, but not within the compaction member 120. This embodiment, also illustrates the use of a second cooling member 121 that can be positioned proximate the compaction member 120, but not within the compaction member 120. In embodiments, the controller 102 activates the cooling source 109 to provide a cooling medium for the cooling members 111 and 121. In embodiments, the cooling members 111 and 121 and/or the heating members 112 (FIG. 1) and 122 include one or more temperature sensors that are used by the controller 102 at least in part to control the amount of heat produced by the heating members 112 and 122, and the amount of cooling provided to the cooling members 111 and 121.

Figure 3:
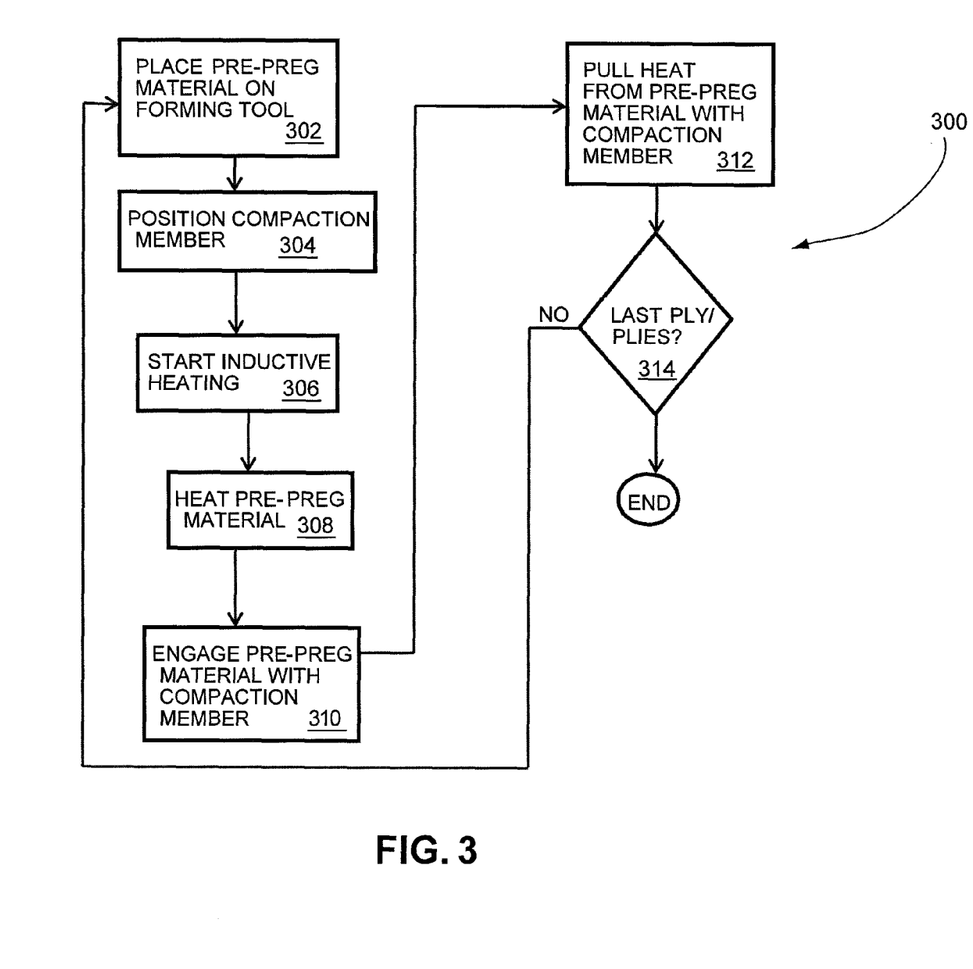
FIG. 3 is an in-situ compaction buildup process flow diagram of one embodiment of the present invention.

Referring to FIG. 3, an in-situ compaction buildup process flow diagram 300 that describes a method of implementing systems of an embodiment is illustrated. The process starts by first placing a layer or layers of pre-preg material on a tool surface, or on at least one other ply/plies of pre-preg material that is laid up on a tool (302). In embodiments, the layers can be compacted on each other one at a time or several at a time depending on the application and desired outcome. The compaction member 120 is then positioned in relation to the pre-preg material (304). Once the compaction member 120 is in the correct position to start compaction, the induction heating member 112 is started (306). The induction heating member 112 uses electromagnetic waves of a select power, frequency and time that excites electrons in the conductive fibers and/or conductive components of the matrix of the pre-preg material resulting in the pre-preg being heated up (308). Once the pre-preg material is heated, the compaction member engages the pre-preg material therein, compacting the pre-preg material (310). As the compaction member is compacting the pre-preg material, the compaction member is also pulling heat from the pre-preg material (312). Accordingly, the heat, along with the compaction member, allows a tight nesting or consolidation of the plies of pre-preg material and the extracting of the heat by the compaction member solidifies the laminate in a laminated state (i.e., a partially or fully consolidated state, depending on the composite material used in the process). In the compaction flow diagram 300 embodiment, it is then determined if a last ply or plies of pre-preg material has been applied at step (314). If it is not the last ply/plies (314), the process continues at step (302) by applying another ply/plies of pre-preg material over the prior laminated and compacted plies on the forming tool at step (302). If it is the last ply/plies (314), the process ends. In embodiments, the ply layers can be added in the in-situ process so the ply layers totally cover previously formed ply layers, or subsequent ply layers may only cover portions of previously formed ply layers depending on the desired outcome.

Figure 4A:
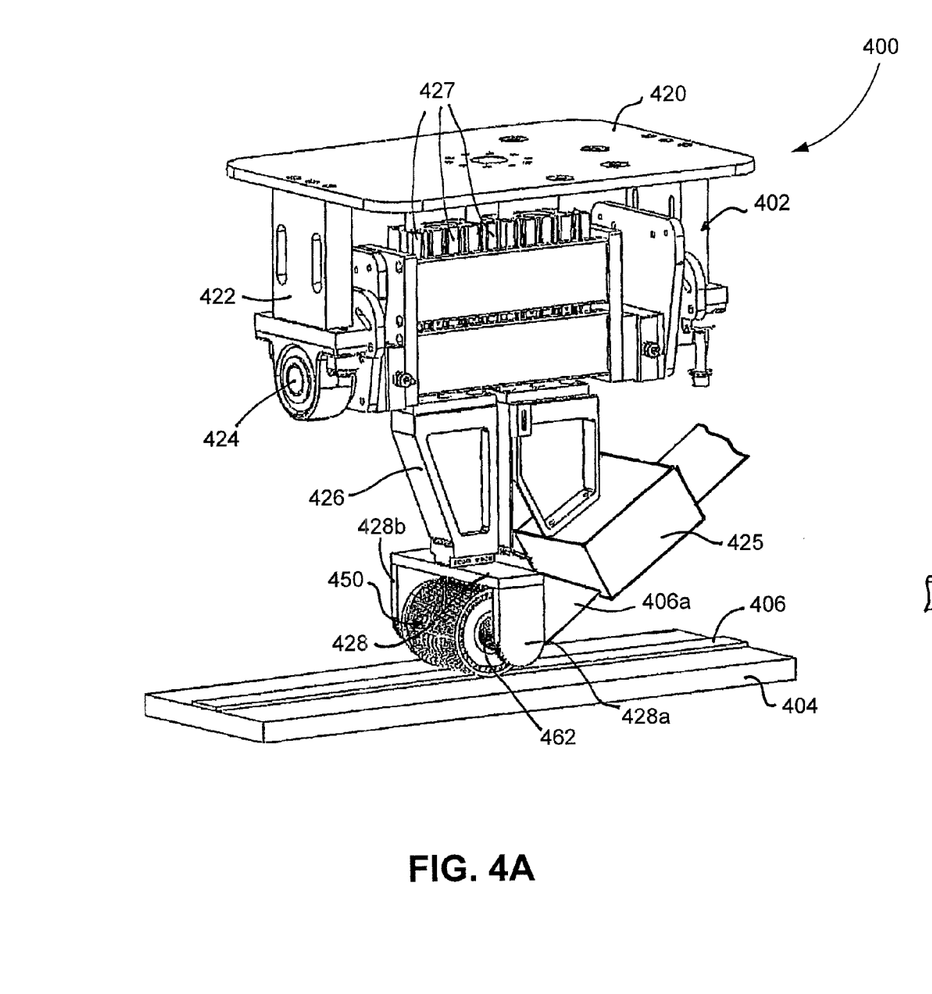
FIG. 4A is a side perspective view of an induction heating compaction system of one embodiment of the present invention.
Figure 4B:
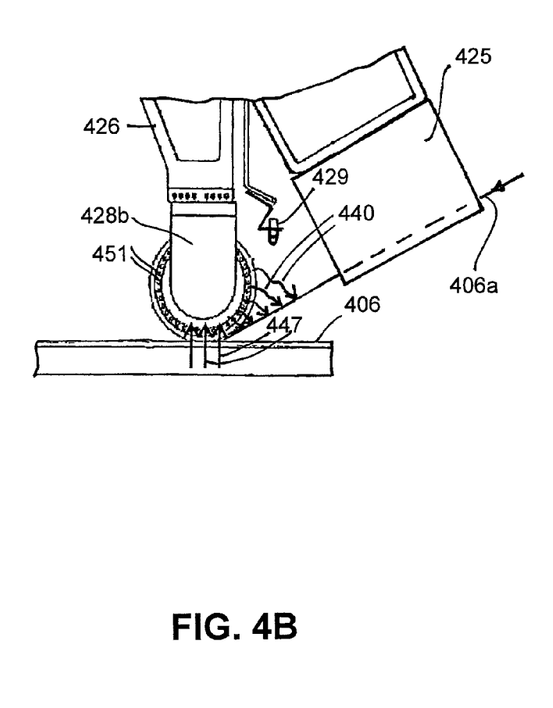
FIG. 4B is a side view of a portion of the induction heating compaction system of FIG. 4A.

An example of an induction heating compaction system 400, of an embodiment, is illustrated in FIG. 4A. This embodiment uses a compaction roller 450. Moreover, the induction heating compaction system 400 includes a positioning holding head 402. The positioning holding head 402 includes a mounting plate 420 that can be coupled to a further positioning system arm (not shown). The mounting plate 420 is coupled to a bracket assembly 422. The bracket assembly 422 includes a pivot connection 424 that allows the positioning holding head 402 to be pivoted to position the positioning holding head 402 in a desired orientation. Extending from the bracket assembly 422 is a spacer 426. The spacer 426 is coupled to one or more actuators 427 that selectively move the spacer 426 up and down. A holding bracket 428 is coupled to the spacer 426. The holding bracket 428 is designed to hold the compaction roller 450. In particular, the holding bracket 428 includes a first holding arm 428a and a spaced, second holding arm 428b. A roller axle 462 of the compaction roller 450 is coupled between the first and second holding arms 428a and 428b of the holding bracket 428. FIG. 4A further illustrates the compaction roller 450 engaging plies of pre-preg material 406 that have been laid up on a forming tool 404. In particular, FIG. 4A illustrates the compaction (in-situ) of a ply layer or ply layers 406a on one or more ply layers 406 that have been laid up on a forming tool 404. Referring to the side view illustrated in FIG. 4B, a description of the induction heating and heat transfer is provided. In particular, FIG. 4B illustrates an induction field 440, as depicted by arrows, that is produced by an induction heating member that is housed within the compaction roller 450, as further described in relation to FIG. 6C below. The induction field 440 heats ply layer or ply layers 406a. As the compaction roller 450 engages the ply layers 406a, heat 447 from the ply layers 406a is extracted back to the compaction roller 450 and the ply layers 406a are solidified in a compact state. Compaction roller 450, in this embodiment, includes cooling passages 451 that help maintain the compaction roller 450 in a cool state. FIG. 4B further illustrates a temperature sensor 429 positioned to view and sense temperature of material 406a and provide feedback to controller 102 (FIGS. 1 and 2). A second induction temperature sensor (not shown) can be used to measure the temperature of a compaction roller cover 452 (see FIG. 6B) and provide feedback to controller 102. Also illustrated in FIGS. 4A and 4B is a material dispensing member 425 that is designed to dispense and position the one or more ply layers 406a with respect to the roller 450. The material dispensing member 425 typically includes the capability to cut and restart the material 406a as needed in the lay-up.

Figure 5A:
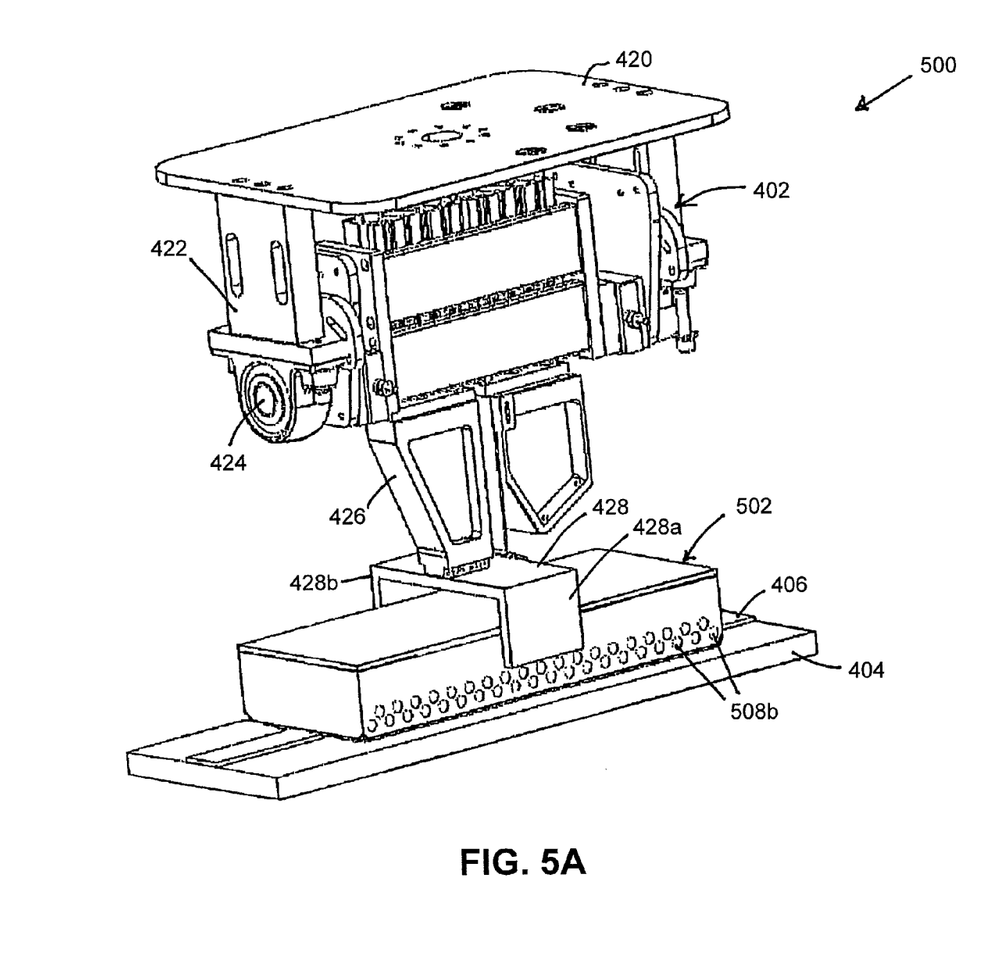
FIG. 5A is a side perspective view of another induction heating compaction system of one embodiment of the present invention.
Figure 5B:
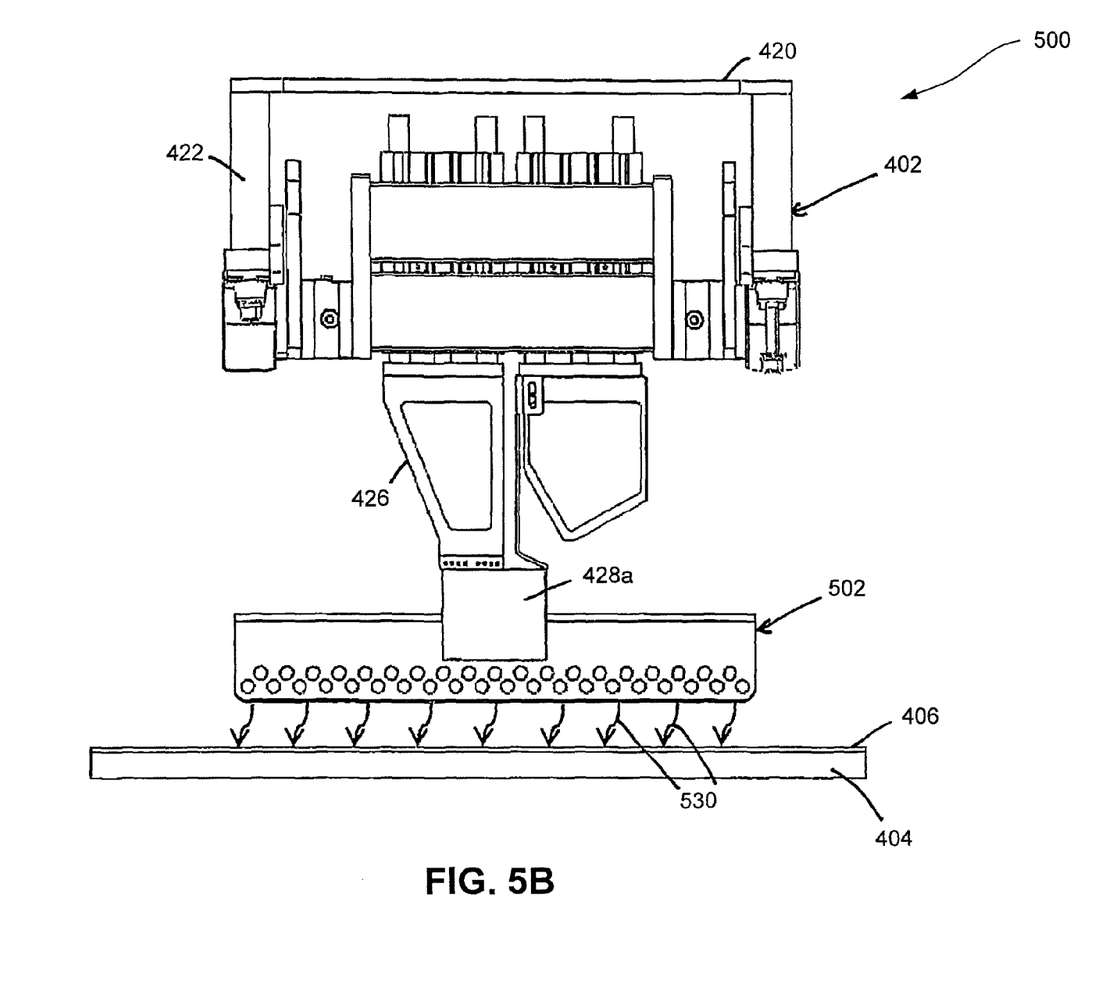
FIG. 5B is a side perspective view of the induction heating compaction system of FIG. 5A.
Figure 5C:
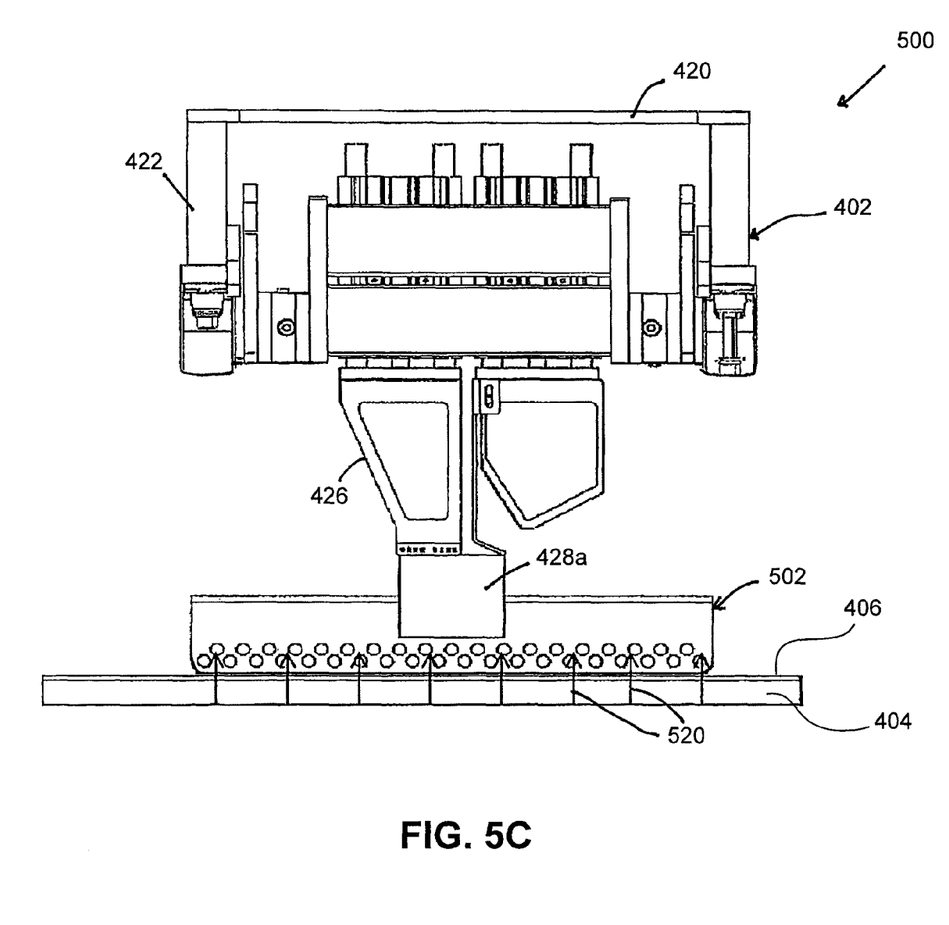
FIG. 5C is a side perspective view of the induction heating compaction system of FIG. 5A.

Another example embodiment of an induction heater compaction system 500 is illustrated in FIG. 5A. In the induction heating compaction system 500, a compaction foot 502 (or compaction shoe) is used as the compaction member. In this embodiment, the compaction foot 502 is coupled to the positioning holding head 402 via the holding bracket 428. In particular, the compaction foot 502 is coupled between the first and second holding arms 428a and 428b of the holding bracket 428. As illustrated in FIG. 5A, the compaction foot 502 is positioned to compact the plies of pre-preg material 406 positioned on the tool 404. In this embodiment, the cooling members includes cooling passages 508b. The cooling passages 508b in the compaction foot 502 help maintain the compaction foot 502 in a cool state to allow the compaction foot 502 to extract heat from the pre-preg material 406 to solidify the plies in a compacted state. Although only roller and foot configuration examples of the compaction member are provided, other configurations can be used and the present invention is not limited to just roller and foot configurations. Referring to FIG. 5B, an illustration of the induction heating compaction system 500 positioned to provide induction heat 530 to the pre-preg material 406 is provided. As illustrated, in this embodiment, the compaction foot 502 is spaced a select distance from the pre-preg material 406 when providing the induction field 530. In other embodiments, the compaction foot 502 can already be in motion to make contact or already be in contact with the pre-preg material 406 when the induction field 530 is energized. Once the pre-preg material 406 has been heated, the compaction foot 502 of the induction heating compaction system 500 compacts the pre-preg material 406 as illustrated in FIG. 5C. Also illustrated in FIG. 5C is the heat 520 being extracted from the pre-preg material 406 into the compaction foot 502 to solidify the pre-preg material 406 in a compact configuration.

Figure 6A:
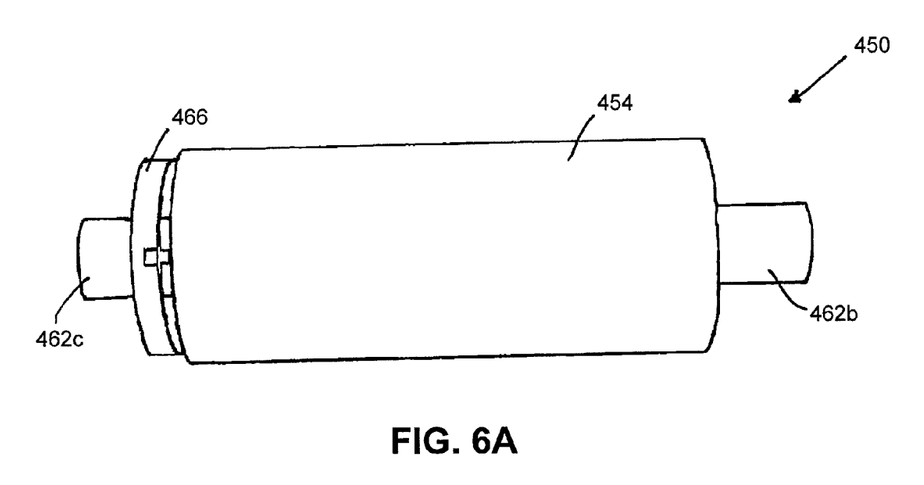
FIG. 6A is a front view of an induction heating compaction roller used in the induction heating compaction system of FIG. 4A.
Figure 6B:
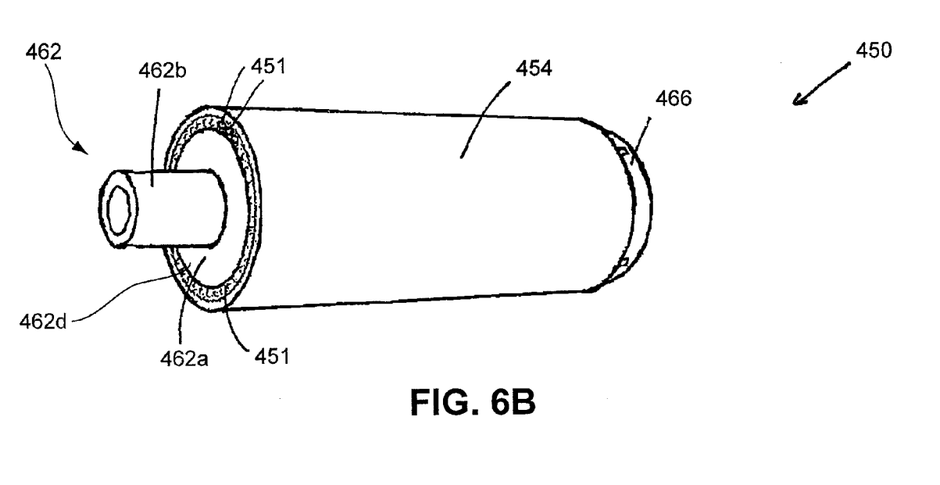
FIG. 6B is a front perspective view of the induction heating compaction roller of FIG. 6A.
Figure 6C:
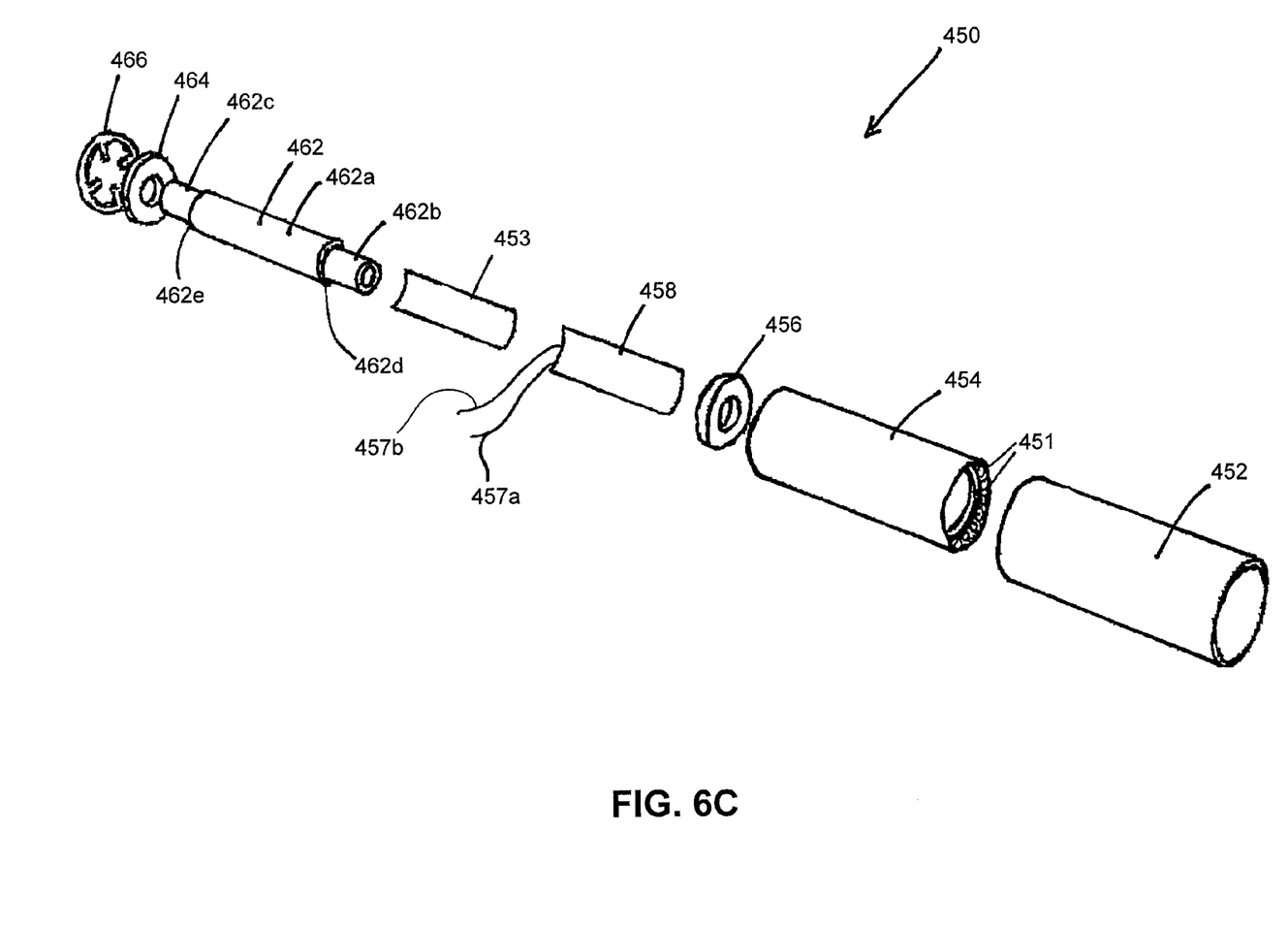
FIG. 6C is a front perspective exploded view of the induction heating compaction roller of FIG. 6A.

The compaction roller 450 is further illustrated in FIGS. 6A through 6C. In particular, FIG. 6A illustrates a front view of the assembled compaction roller 450, FIG. 6B illustrates a front perspective view of the compaction roller 450, and FIG. 6C illustrates an exploded unassembled view of the compaction roller 450. Referring to FIG. 6C, the compaction roller 450 in this embodiment includes, a roller axle 462 that has a cylindrical mid-portion 462a and opposed first and second end portions 462b and 462c. The first and second end portions 462b and 462c have smaller diameters than the mid-portion 462a. In another embodiment, a pair of stub shafts are used instead of the roller axle 462. The pair of stubs would function as the first and second end portions 462b and 462c of the roller axle 462. A cylindrical shielding 453 is received over the mid-portion 462a of the roller axle 462 in this embodiment. The shielding 453 shields at least a portion of the roller axle 462 from the electromagnetic waves generated by an induction heating member 458. In an embodiment, the shielding 453 is made with electromagnetic wave shielding material. For example, the shielding material could be made from thin sheets of copper and/or aluminum or high nickel content foil that is tailored to the frequencies used in the process. For example, the higher the frequency, the thinner the sheets used. Other types of electromagnetic wave shielding material known in the art could also be used. The induction heating member 458 is then, in turn, received over the shielding 453. A pair of lead wires 457a and 457b that provide energy from a power source to the induction heating member 458 are also illustrated in FIG. 6C. A first bearing 456 is received on the first end portion 462b of the roller axle 462. The first bearing 456 engages a first shoulder 462d formed between the first end portion 462b and the mid-portion 462a of the roller axle 462. A second bearing 464 is received on the second end portion 462c of the roller axle 462. The second bearing 464 engages a second shoulder 462e formed between the second end portion 462c and the mid-portion 462a of the roller axle 462. A main roller support 454 is received over the roller axle 462. The main roller support 454 engages the first and second bearings 456 and 464 such that the main roller support 454 is rotationally coupled to the roller axle 462. The main roller support 454 in this embodiment includes a plurality of cooling passages 451, as best seen in FIG. 6B. Further, in this embodiment, a cooling device 466 is mounted on the second end portion 462c of the roller axle 462. The cooling device 466 in this embodiment provides flow of fluids or gas through the plurality of cooling passages 451 in the main roller support 454. In other embodiments, passive cooling may be used and cooling device 466 may not be needed. A roller cover 452 is received over the main roller support 454. The roller cover 452 is designed to compact ply layers of pre-preg material. The roller cover 452 may be solid or a compliant material to conform to the shape being consolidated. Moreover, in some embodiments, the roller cover 452 is designed to be replaced.

Figure 7A:
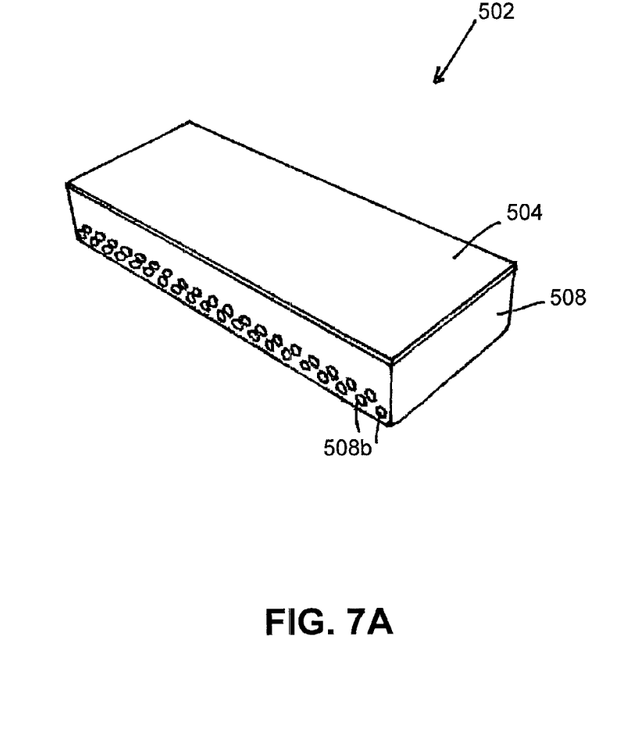
FIG. 7A is a side perspective view of an induction heating compaction foot used in the induction heating compaction system of FIG. 5A.
Figure 7B:
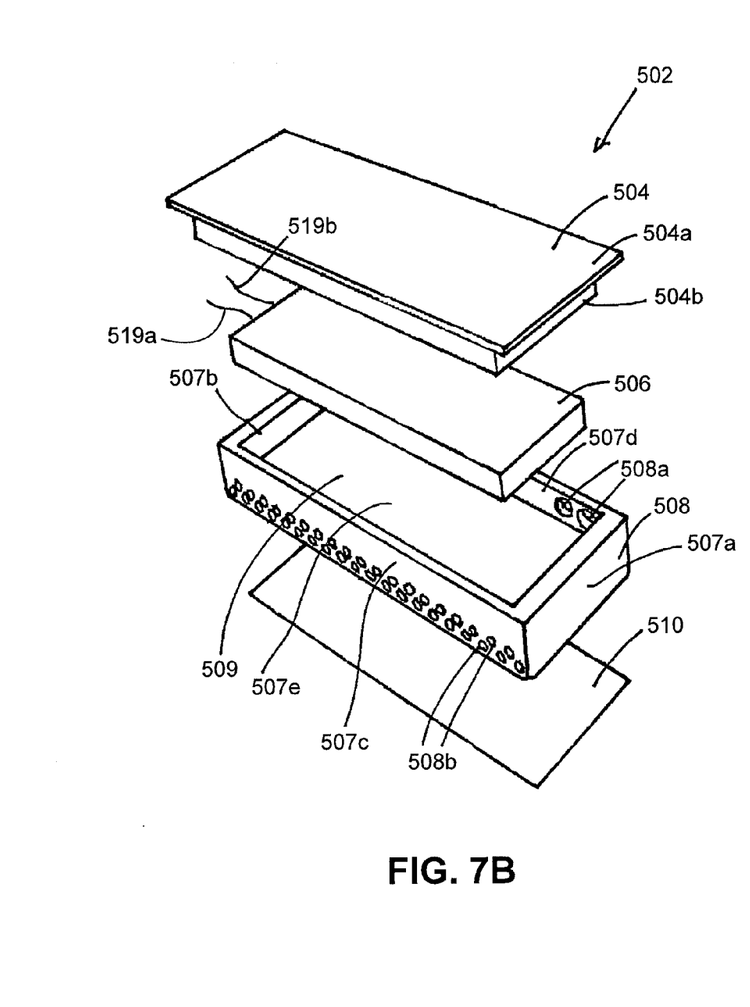
FIG. 7B is a side perspective exploded view of the induction heating compaction foot of FIG. 7A.

An embodiment that uses a compaction foot (or shoe) 502 is illustrated in the assembled side perspective view of FIG. 7A and the exploded (unassembled) side perspective view of FIG. 7B. The compaction foot 502 includes a stamp member 508. The stamp member 508, in this embodiment, has a rectangular base portion 507e. The stamp member 508 further has opposed first and second end walls 507a and 507b that extend from opposed ends of the rectangular base portion 507e. The stamp member 508 also has opposed first and second side walls 507c and 507d that extend from opposed sides of the rectangular base portion 507e. The first and second end walls 507a and 507b, the first and second side walls 507c and 507d and the base portion 507e form an inner chamber 509 of the stamp member 508. A plurality of cooling passages 508a and 508b extend through the first and second side side walls 507c and 507d of the stamp member 508 and form at least part of a cooling assembly. An engaging member 510 (or engaging cover) is coupled to a bottom of the base portion 507e of the stamp member 508. The engaging member 510 can be a solid surface or a compliant surface to accommodate local contour. In one embodiment, the engaging member 510 is covered with a low adherence material for easy release from the pre-preg material. The engaging member 510 is designed to engage and compact ply layers of pre-preg material. An induction heating member 506 is received in the inner chamber 509 of the stamp member 508. Also shown in FIG. 7B, are lead wires 519a and 519b that deliver power from a power source to the induction heating member 506. The compaction foot 502 of this embodiment further includes a shield member 504. The shield member 504 includes a shield top cover 504a and a shield side extending portion 504b that extends from the shield top cover 504a to form an inner chamber in which the induction heating member 506 is received. The shield side extending portion 504b is, in turn, received in the inner chamber 509 of the stamp member 508. The shield top cover 504a covers the inner chamber 509 of the stamp member 508. The shield member 504 design may vary with the purpose to protect areas where the induction field is not desirable, and allow it to focus on the material to be compacted. Hence, the shield member 504 is made from electromagnetic wave shielding material that shields other components from the electromagnetic field generated by the induction heating member 506. In other embodiments, the compaction foot 502 is made up of sections that move independently to each other so that the compaction feet 502 can walk across the pre-preg material in the in-situ compaction buildup process. Moreover, in other embodiments more than one compaction shoe 502 is used in the in-situ compaction buildup process. In addition, although the compaction shoe 502 is illustrated as being rectangular in shape, the compaction shoe 502 may be any shape that conforms the pre-preg layers to the desired shape of the formed composite structure. The same is true of the compaction roller 450, as discussed above.

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present invention. Therefore, it is manifestly intended that this invention be limited only by the claims and the equivalents thereof.

The invention claimed is:

1. An induction heating compaction system, the system comprising:
   a compaction member configured and arranged to extract heat energy from a pre-preg material while compacting the pre-preg material, the compaction member comprising:
   a compaction roller comprising:
   one of a roller axle or stub shafts;
   at least one shielding member positioned over the one of the roller axle or the stub shafts;
   a first bearing received on a first end portion of the one of the roller axle or the stub shafts;
   a second bearing received on a second end portion of the one of the roller axle or the stub shafts;
   a main roller support received over the one of the roller axle or the stub shafts and engaging the first bearing and the second bearing to rotationally couple the roller support to the one of the roller axle or the stub shafts; and
   a roller cover received over the main roller support, the roller cover configured and arranged to compact composite pre-preg material;
   an induction heating member contained within the compaction member and configured to provide an electromagnetic field at a select frequency, the select frequency configured to increase heat energy in at least one of fibers or matrix in pre-preg material, wherein the induction heating member is positioned over the at least one shielding member; and
   an active cooling assembly separate from the induction heating member and contained within the compaction member, the active cooling assembly comprising an active cooling feature configured to extract the heat energy from the pre-preg material.

2. The system of claim 1, wherein the compaction member has at least one portion comprising a material that is transparent to the select frequency of the electromagnetic field provided by the induction heating member enabling the electromagnetic field to be directed at a composite pre-preg material to be consolidated while at least partially isolating the at least one portion of the compaction member from heating effects of the electromagnetic field.

3. The system of claim 1, wherein the at least one shielding member is positioned to shield at least one reactive portion of the compaction member that is not transparent to the electromagnetic field provided by the induction heating member to at least partially shield the at least one reactive portion of the compaction member from the heating effects of the electromagnetic field.

4. The system of claim 1, wherein the cooling assembly comprises a plurality of cooling passages extending at least partially through the compaction member for extracting heat energy from the pre-preg material.

5. The system of claim 1, further comprising:
   a positioning assembly configured and arranged to position the compaction member in a desired location.

6. The system of claim 5, further comprising:
a controller coupled to control the positioning assembly.

7. The system of claim 6, wherein the controller is further configured to control the heating, compaction and cooling of the pre-preg material to a solidified state as the induction heating compaction system passes over the pre-preg material in a continuous compaction process.

8. An induction heating compaction system, the system comprising:
an induction heating member configured to provide an electromagnetic field at a select frequency, the select frequency configured to increase heat energy in at least one of fibers or matrix in pre-preg material; and
a compaction roller configured and arranged to extract heat energy from the pre-preg material while compacting the pre-preg material, wherein the compaction roller comprises:
a roller axle;
a cylindrical shielding configured and arranged to be received over the roller axle, wherein the induction heating member is configured and arranged to be received over the shielding;
a first bearing received on a first end portion of the roller axle;
a second bearing received on a second end portion of the roller axle;
a main roller support received over the roller axle and engaging the first and second bearings such that the main roller support is rotationally coupled to the roller axle; and
a roller cover received over the main roller support, the roller cover configured and arranged to compact composite pre-preg material.

9. The system of claim 8, wherein:
the roller axle further comprises a cylindrical mid-portion between opposed first and second end portions of the roller axle, the first and second end portions having a smaller diameter than the mid-portion;
the cylindrical shielding is received over the mid-portion of the roller axle;
the first bearing engages a first shoulder between the first end portion and the mid-portion of the roller axle;
the second bearing engages a second shoulder between the second end portion and the mid-portion of the roller axle; and
the main roller support includes a plurality of cooling passages.

10. The system of claim 9, further comprising:
a cooling device configured and arranged to provide a flow path for at least one of a gas or a liquid through the plurality of cooling passages in the main roller support.

11. The induction heating compaction system of claim 8, wherein the induction heating member is separate from the compaction roller.

12. An induction heating compaction system, the system comprising:
a compaction member configured and arranged to compact in-situ at least one ply layer of pre-preg material laid up and positioned over at least another ply layer of pre-preg material previously laid up and positioned over a surface of a forming tool, wherein the compaction member comprises a compaction roller comprising:
a roller axle;
at least one shielding member positioned over the roller axle; and
a main roller support positioned over the roller axle and rotationally coupled to the roller axle, the main roller support having an outer surface configured and arranged to compact composite pre-preg material;
an induction heating member received within the compaction member and positioned over the at least one shielding member, the induction heating member configured to provide an electromagnetic field at a select frequency, the select frequency configured to heat at least one of fibers or matrix in pre-preg material, the at least one shielding member configured to at least partially isolate a portion of the compaction member from the electromagnetic field provided by the induction heating member;
the compaction member having at least a portion comprising a material that is transparent to the select frequency of the electromagnetic field provided by the induction heating member enabling the electromagnetic field to be directed at a composite pre-preg material to be consolidated, while at least partially isolating the compaction member from heating effects of electromagnetic field; and
a cooling assembly configured and arranged to extract heat energy from the pre-preg material to solidify the ply layers of pre-preg material during compaction.

13. The system of claim 12, wherein the cooling assembly is positioned within the compaction member.

14. The system of claim 12, wherein the cooling assembly includes at least one cooling passage.

15. The induction heating compaction system of claim 12, wherein the compaction member is further configured and arranged to compact the at least one ply layer of pre-preg material that completely covers the at least another ply layer of pre-preg material previously laid up and positioned over the surface of the forming tool.

16. The induction heating compaction system of claim 12, wherein the induction heating member is separate from the cooling assembly.

17. The induction heating compaction system of claim 12, wherein the cooling assembly is positioned in the compaction member.

18. An induction heating compaction system, the system comprising:
a compaction roller configured and arranged to compact ply layers of pre-preg material, the compaction roller comprising:
a roller axle having opposed first and second end portions;
a cylindrical shielding positioned over the roller axle, wherein the induction heating member is positioned over the shielding;
a first bearing received on the first end portion of the roller axle;
a second bearing received on the second end portion of the roller axle;
a main roller support received over the roller axle and engaging the first and second bearings to rotationally couple the main roller support to the roller axle; and
a roller cover received over the main roller support, the roller cover configured and arranged to compact pre-preg material;
an induction heating member received within the compaction roller, the induction heating member configured to provide an electromagnetic field at a select frequency, the select frequency configured to heat at least one of fibers or matrix in pre-preg material;

the compaction roller having at least a portion comprising a material that is transparent to the select frequency of the electromagnetic field provided by the induction heating member enabling the electromagnetic field to be directed at a composite pre-preg material to be consolidated, while at least partially isolating the compaction roller from heating effects of electromagnetic field; and a cooling assembly configured and arranged to extract heat energy from the pre-preg material to solidify the ply layers of pre-preg material in a compact configuration during an in-situ compaction buildup process.

19. The system of claim 18, wherein the main roller support includes a plurality of cooling passages.

20. A method of consolidating pre-preg material ply layers with the induction heating compaction system of claim 1, the method comprising:

inductively heating an area of at least one of fibers or matrix in at least one first pre-preg material ply layer with the induction heating member to soften the matrix in the heated area; and compacting the heated area of the at least one first pre-preg material ply layer with the compaction member during lay-up of the at least one first pre-preg material ply layer over at least one second pre-preg material ply layer.

21. The method of claim 20, further comprising:

extracting heat energy from the at least one first pre-preg material ply layer and the at least one second pre-preg material ply layer while compacting the heated area to solidify the at least one first pre-preg material layer and the at least one second pre-preg material ply layer in a compact state.

* * * * *

UNITED STATES PATENT AND TRADEMARK OFFICE
CERTIFICATE OF CORRECTION

Page 1 of 1

PATENT NO. : 9,527,237 B2
APPLICATION NO. : 13/734661
DATED : December 27, 2016
INVENTOR(S) : Vernon M. Benson, David R. Machac and Brian J. Loveless It is certified that error appears in the above-identified patent and that said Letters Patent is hereby corrected as shown below:

In the Specification

| | | |
|---|---|---|
| Column 5, | Line 51, | change "(see FIG. **6B**)" to --(see FIG. **6C**)-- |
| Column 6, | Line 2, | change "cooling members" to --cooling member-- |
| Column 6, | Line 37, | change "shafts are used" to --shafts is used-- |

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*